United States Patent [19]

Firey

[11] Patent Number: 5,031,397
[45] Date of Patent: Jul. 16, 1991

[54] STARTING METHODS FOR CYCLIC CHAR FUEL REACTION PLANTS

[76] Inventor: Joseph C. Firey, P.O. Box 15514, Seattle, Wash. 98115-0514

[21] Appl. No.: 484,507
[22] Filed: Feb. 26, 1990
[51] Int. Cl.⁵ .............................. F02C 7/26; F02C 3/26
[52] U.S. Cl. ............................... 60/39.141; 60/39.463; 60/39.464
[58] Field of Search ............ 60/39.464, 39.13, 39.141, 60/39.142, 39.15, 39.21, 39.463

[56] References Cited
U.S. PATENT DOCUMENTS

| | | | |
|---|---|---|---|
| 3,704,586 | 12/1972 | Bruns | 60/39.142 |
| 4,484,531 | 11/1984 | Firey | 60/670 |
| 4,584,949 | 4/1986 | Brännström | 60/39.464 |
| 4,590,868 | 5/1986 | Ishihara | 60/39.464 |
| 4,730,452 | 3/1988 | Källman | 60/39.464 |
| 4,889,539 | 12/1989 | Firey | 60/39.12 |

Primary Examiner—Louis J. Casaregola
Assistant Examiner—John A. Savio, III

[57] ABSTRACT

An improved method of starting cyclic char fuel reaction plants is described wherein during compressor cranking for starting compressed air is heated by burning with a liquid fuel and then enters the pore spaces of the char fuel within the char fuel containers in order to increase the temperature of the char fuel to where it reacts rapidly with air.

12 Claims, 3 Drawing Sheets

STARTING METHODS FOR CYCLIC CHAR FUEL REACTION PLANTS

CROSS REFERENCES TO RELATED APPLICATIONS

The inventions described herein are usable on the inventions described in my earlier filed U.S. Patent application entitled, *Steady Work Output Rate Apparatus for Cyclic Solid With Gas Reactors* U.S. Ser. No. 07/349,526, filed May 9, 1989 now U.S. Pat. No. 4,889,539. The inventions described herein were previously described in my earlier filed disclosure document entitled, *Improved Starting Methods For Cyclic Char Fuel Reaction Plants.*

BACKGROUND OF THE INVENTION

1. Field of the Invention

This invention is in the field of coal gasifiers and coal burners utilizing cyclic compression and expansion to force reactant gases into the coal pores and to expand reacted gases out of the coal pores.

2. Description of the Prior Act

The following U.S. Patents describe several types of cyclic char fuel reaction plants, and are examples of such plants with which the devices of this invention are usable:

U.S. Pat. No. 4,455,837; J. C. Firey, June 26, 1984
U.S. Pat. No. 4,484,531; J. C. Firey, Nov. 27, 1984
U.S. Pat. No. 4,509,957; J. C. Firey, Apr. 9, 1985
U.S. Pat. No. 4,568,361; J. C. Firey, Feb. 4, 1986

In all of these examples cyclic char fuel reaction plants the gaseous reactants, such as air, are compressed into the pore spaces of the char fuel contained within several pressure vessel containers. Primary reaction of the gaseous reactants with the char fuel occurs within the pore spaces during compression. Expansion of these primary product gases then occurs out of the pore spaces of the char fuel. In some forms of cyclic char fuel reaction plant the primary product gases are further reacted with additional reactant gases in a secondary reaction within a secondary reaction chamber during expansion. This cycle of gas compression followed by expansion is repeated for each of the char fuel containers, with fresh gaseous reactants being supplied for each compression and with final product reacted gases being removed during each expansion. The descriptions of cyclic char fuel reaction plants contained in the above listed U.S. Patents are incorporated herein by reference thereto. The compressors of these plants are separate from the expanders thereof, but may be driven thereby, as for example where a centrifugal compressor is driven via its input shaft by the output shaft of a gas turbine engine expander.

The compressor means of these cyclic char fuel reaction plants comprise one or more stages, as defined in the material incorporated by reference, and each such stage has a delivery end outlet at its high pressure end through which the compressed gas may flow out of the stage and into a connected char fuel container. The expander means of these cyclic char fuel reaction plants may be a work producing engine and comprise one or more stages, as defined in the material incorporated by reference. Additional detailed descriptions of compressor means and expander means and compressor drive means are presented in the material incorporated by reference, for example in U.S. Pat. No. 4,509,957, col. 15, line 11, through col. 17 line 44.

Several char fuel containers are used on these cyclic char fuel reaction plants and these are pressure vessels whose number at least equals the sum of the number of compressor stages plus the number of expander stages. Each of these containers is fitted with a refuel means for adding char fuel into the refuel end of the container and an ash removal means for removing ashes or spent char fuel material from the ash removal end of the container.

Each container has separate changeable gas flow connections to each delivery end outlet of each compressor stage and these gas flow connections can be opened or closed while the plant is operating. These changeable gas flow connections are opened and closed by a means for opening and closing which is controlled so that each container is opened for a time period to each delivery end outlet of each stage of the compressor, in a sub sequence of time periods of open gas flow connections to compressor stages, proceeding in time order of increasing compressor stage delivery pressure. During any one time period of this sub sequence of time periods each container is open gas flow connected to but one compressor stage delivery end outlet and each compressor stage delivery end outlet is open gas flow connected to but one container. Additional detailed descriptions of char fuel containers and changeable gas flow connections are presented in the material incorporated by reference, for example in U.S. Pat. No. 4,509,957, col. 14, line 46 through line 58, and col. 18, line 39 through line 52.

As used herein and in the claims the term char fuel is as defined in U.S. Pat. No. 4,509,957, col. 2, line 58 through line 68, and in U.S. Pat. No. 4,455,837, col. 4, line 8 through line 16, and this material is incorporated herein by reference.

As used herein and in the claims the terms oxygen gas, and a gas containing appreciable oxygen gas, are as defined in U.S. Pat. No. 4,509,957, col. 3, line 1 through line 8 and in U.S. Pat. No. 4,455,837, col. r, line 1 through line 7, and this material is incorporated herein by reference.

Prior art cyclic char fuel reaction plants have described various methods for starting the plant up. Char fuels must be brought up to a temperature at which they will react rapidly with oxygen gas in adjacent compressed gases before the plant is started and capable of running itself. This preheating of the char fuel is the slowest step of the startup process and it would be desirable to have available startup methods which more quickly heated up the char fuel to this rapid reaction temperature. One startup method of the prior art uses preheated air or oxygen rich gas as the gas compressed into the char fuel pores, this gas preheating being done by electrical resistance heaters or combustion fired heat exchangers as the gas flows from the compressor into the char fuel containers. This air preheating startup method is described in U.S. Pat. No. 4,509,957, col. 7, line 36 through line 63 and in other portions of the prior art references incorporated herein by reference. Another startup method of the prior art burns a fuel gas with spark ignition at the end of a borehole into an underground coal seam to preheat the gases being compressed into the pores of the coal within the underground seam. This gas fired startup method is described in U.S. Pat. No. 4,509,957, FIG. 6, and Col. 18 line 3 through line 29.

SUMMARY OF THE INVENTION

Several separate starting reaction chambers are interposed between the several delivery outlets of each stage of the separate compressor of a cyclic char fuel reaction plant and the connected char fuel container. During compressor cranking for startup a liquid fuel is burned with the compressed air passing through these starting reaction chambers. During compression these consequently hot burned gases pass into the pore spaces of the char fuel within the containers and heatup the char fuel to its rapid reaction temperature. When a sufficient portion of the char fuel within the containers is thusly brought up to the rapid reaction temperature the cyclic char fuel reaction plant is then capable of running itself and is started. Thereafter the flow of liquid fuel into the starting reaction chambers is stopped.

By thusly forcing very hot burned gases directly inside the char fuel pore spaces a quick heating of the char fuel to its rapid reaction temperature is achieved, resulting in a quick startup of the cyclic char fuel reaction plant, and this is a principal beneficial object of this invention.

In a preferred form of this invention the hot compressed burned gases pass from the starting reaction chamber into the ash removal end of the container and may thus flow both into and through the pore spaces of the char fuel resulting in a yet more rapid transfer of heat into the char fuel.

In another preferred form of this invention the starting reaction chamber is valved out of the char fuel reaction plant after startup is completed. With this scheme gas blowdown losses during container connection changeover are minimized and plant work efficiency improved.

As the char fuel within containers is heated during startup it will reach a temperature at which it can react appreciably with oxygen. By reducing liquid fuel flow rate into the starting reaction chamber when this char fuel temperature is reached more oxygen gas will be available in the hot burned gases for direct reaction with the char fuel. The consequently increased direct reaction of char fuel and oxygen gas releases its heat of reaction at the char fuel surface and thus into the char fuel. In this way the rate of heatup of the char fuel can be further increased and a yet quicker startup achieved.

DESCRIPTION OF THE PREFERRED EMBODIMENTS

Figure 1:
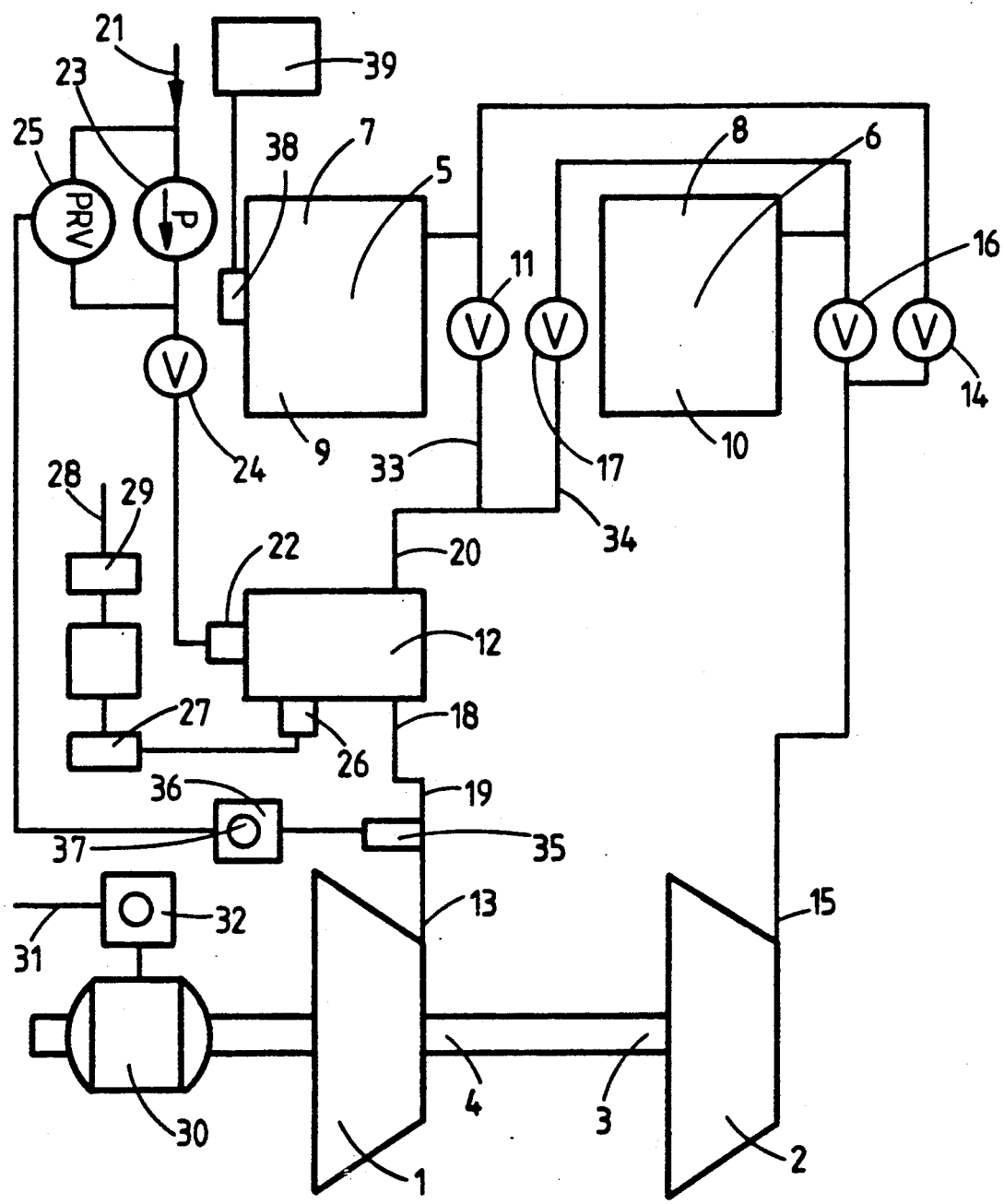

All forms of this invention comprise a cyclic char fuel reaction plant with separate compressor and expander, as described hereinabove and in the material incorporated by reference, to which the following elements are added:

1. Each delivery end outlet of each stage of the compressor is connected to the inlet of a separate starting reaction chamber. Each starting reaction chamber has an outlet which is at a different place on the starting reaction chamber than the inlet. These starting reaction chambers are pressure vessels preferably lined with an insulating material, such as a ceramic, and may be externally cooled if necessary.

2. Each starting reaction chamber is fitted with a means for injecting liquid fuel therein and comprising: a liquid fuel supply from which a pumping means pumps liquid fuel to an atomizing nozzle means which creates an atomized spray of liquid fuel within the starting reaction chamber. A valve is also used for opening or stopping the flow of liquid fuel to the nozzle. Additionally this injection means comprises an adjustment means for adjusting the mass flow rate of liquid fuel into the starting reaction chamber. These pumps, nozzles, valves and adjustments can be any of those in common use and well known in the art of liquid atomizing schemes.

3. Each starting reaction chamber is fitted with an igniter to ignite the atomized spray of liquid fuel in air inside the chamber. Various types of igniters are usable for this purpose, such as gas fueled pilot flames or preferably electric sparks. An electric spark igniter can be battery powered or powered from an external energy source. The electric spark can be continuous or intermittent but if intermittent should be of sufficiently high frequency that many sparks occur within each time interval of the sub sequence of time periods of open gas flow connections to compressor stages. This ignition means also comprises a means for turning it on or off.

4. A cranking means is needed to drive the compressor when the cyclic char fuel reaction plant is to be started. Various kinds of cranking motors can be used for this purpose as, for example; an electric motor powered from a battery or external power source; an expander engine, if mechanically coupled to the compressor, and energized by a high pressure gas such as steam or compressed air for startup. A means for turning on the cranking means when starting commences, and for turning off the cranking means when starting is completed, is also needed. In some forms of cyclic char reaction plant the expander may be an engine whose power output exceeds the power input to the compressor and a net power output results which may be absorbed by an electric generator. This electric generator can in turn be used as a motor for cranking during starting and in this case the turning off of the cranking amounts to turning the cranking motor back to a generator.

Cranking for starting is continued through the following three successive time intervals:

I. A warmup time interval of cranking for heating the char fuel in the containers to that temperature at which some is capable of reacting appreciably with oxygen gas in adjacent compressed gas;
II. A heatup time interval of cranking for heating the char fuel in the containers to that temperature at which some is capable of reacting rapidly with oxygen gas in adjacent compressed gas;
III. A startup time interval of cranking for heating a sufficient portion of the char fuel in the containers to the rapid reaction temperature that the plant is capable of driving itself and is started. After this startup time interval the cranking means can be turned off.

5. A starting means for gas flow interconnecting the several starting reaction chambers, at their inlets to the delivery end outlets of the several stages of the compressor, and at their outlets to the several char fuel containers, is needed during starting. This means for gas flow interconnecting can take several different forms as for example:

A. The simplest first starting means for gas flow interconnecting comprises a fixed open gas flow connection between one starting reaction chamber inlet and a single delivery end outlet of one compressor stage so that each starting reaction chamber inlet is connected to but one compressor stage delivery outlet and each compressor stage delivery outlet is connected to but one starting reaction chamber. The outlet of each starting reaction chamber connects to the several changeable gas flow connections one to each char fuel container. These several changeable gas flow connections are then opened and closed by the means for opening and closing of the cyclic char fuel reaction plant so that: each container is open gas flow connected in turn for a time period to each starting reaction chamber outlet in a sub sequence of time periods of open gas flow connections to starting reaction chambers, proceeding in time order of increasing delivery pressure of the compressor stages connecting to the starting reaction chamber inlets; during any one time period of this sub sequence of open gas flow connections, each starting reaction chamber outlet is open gas flow connected to but one container, and each container is open gas flow connected to but one starting reaction chamber outlet. With this simplest means for gas flow interconnecting, the starting vacation chambers remain in the gas flow passages from the delivery end outlets of the compressor stages, not only during starting, but also during running of the cyclic char fuel reaction plant after startup. This is a disadvantage of this simplest form of means for gas flow interconnecting since, when connections are shifted from one container to the next in the sub sequence, the lower pressure in the newly connected container causes the gas within the starting reaction chamber to blow down irreversibly thus reducing the work output and efficiency of the cyclic char fuel reaction plant when running after startup.

B. One preferred second form of the starting means for gas flow interconnecting comprises adding changeable gas flow connections to the above simplest such means so that the starting reaction chambers are disconnected from the containers and also the delivery end outlets of the compressor stages after the heatup time interval of cranking. In this way the above described blowdown work loss can be avoided and plant efficiency increased. For this one preferred form of starting means for gas flow interconnecting, additional changeable gas flow connections are added at inlet and at outlet of each starting reaction chamber and these are open throughout the warmup and heatup time intervals of cranking but are closed thereafter. A further additional changeable gas flow connection connects between each compressor stage delivery end outlet and the several changeable gas flow connections to each char fuel container and this is closed during the warmup and heatup time intervals of cranking but is open thereafter.

C. The above described first simplest form, and also second preferred form, of the starting means for gas flow interconnecting deliver the hot burned gases from the starting reaction chamber into the same region of the char fuel containers as is used for compressed air delivery during normal running after startup, and this is in some cases preferably into the refuel end of the container. For those cyclic char fuel reaction plants intended to burn the carbon in the char fuel fully to carbon dioxide within the char fuel containers it is necessary to set aside a portion of each container as a secondary reaction chamber wherein char fuel is absent. Within those secondary reaction chambers compressed air is stored during compression to react subsequently during expansion with primary reacted gases emerging from the char fuel pore spaces as is described in the material incorporated herein by reference. A quicker heating of the char fuel for starting these cyclic char fuel reaction plants with complete carbon burning can be obtained when the burned gases from the starting reaction chamber are admitted into the ash removal end of the containers rather than the opposite refuel end of the containers. With this ash removal end admission those hot burned gases destined for the secondary reaction chamber pass first through the char fuel mass and contribute to its more rapid heating.

D. Hence another preferred third form of the starting means for gas flow interconnecting open gas flow connects the starting reaction chamber outlet to the ash removal end of each container in turn via changeable gas flow connections there between during the warmup and heatup time intervals of cranking for starting. These ash removal end changeable gas flow connections are then opened and closed by the means for opening and closing of the cyclic char fuel reaction plant so that: each container is open gas flow connected via its ash removal end in turn for a time period to each starting reaction chamber outlet in a sub sequence of time periods of open gas flow connections to starting reaction chambers, proceeding in time order of increasing delivery pressure of the compressor stages connecting to the starting reaction chamber inlets; during any one time period of this sub sequence of open gas flow connections, each starting reaction chamber outlet is open gas flow connected only to the ash removal end of but one container, and each container is open gas flow connected only via its ash removal end to but one starting reaction chamber outlet. For this purpose the means for opening and closing changeable gas flow connections of the char fuel reaction plant can be switched over to thusly act upon the ash removal end changeable gas flow connections during the warmup and heatup time intervals of cranking for starting, and does not act upon the changeable gas flow connections to compressor delivery end outlets of the cyclic char fuel reaction plant which remain closed during these warmup and heatup time intervals. Following the warmup and heatup time intervals of cranking for starting this means for opening and closing changeable gas flow connections of the cyclic char fuel reaction plant is switched back to act upon the changeable gas flow connections to compressor delivery end outlets of the plant and does not thereafter act upon the ash removal end changeable gas flow connections which remain closed during normal running of the cyclic char fuel reaction plant after startup.

6. An on and off means is needed to turn on the cranking means for driving when the cyclic char fuel reaction plant is to be started and also to turn on the ignition means and to open the liquid fuel valve means. After the heatup time interval this on and off means is to turn off the ignition means and close the liquid fuel valve means. When the cyclic char fuel reaction plant is capable of running itself after the startup time interval the cranking means can be turned off. Ordinary switches and valves, hand operated, is the simplest such on and off means but in many applications wholly or partially automatic on and off means will be preferred.

A cyclic char fuel reaction plant modified in accordance with this invention operates as follows during starting:

1. The on and off means turns on the cranking means for driving, the ignition means and opens the liquid fuel valve.

2. Compressed air from each stage of the now rotating compressor flows into a starting reaction chamber and is there mixed with an atomized spray of liquid fuel.

3. The mixture of air and atomized liquid fuel within each starting reaction chamber is ignited by the ignition means and burns, thus elevating the temperature of the burned gases.

4. The hot burned gases flow from the starting reaction chamber into the connected container and are therein compressed into the pore spaces of the char fuel. Heat is transferred rapidly from the hot burned gases into the char fuel thus increasing the char fuel temperature.

5. When the char fuel reaches its rapid reaction temperature, following the warmup and heatup time intervals of cranking, the liquid fuel valve can be closed and the ignition means turned off. The rapid reaction of the char fuel with oxygen gas in the adjacent compressed air will continue the heating of the char fuel, by the heat of this reaction, during the further startup time interval of cranking thereafter.

6. When a sufficient portion of the char fuel in each container has reached or exceeded the rapid reaction temperature the cyclic char fuel reaction plant will be capable of running itself. Thus ends the startup time interval of cranking after which the cranking means can be turned off as the plant is started.

By thusly forcing the hot burned gases from the starting reaction chamber directly inside the pore spaces of the char fuel a rapid heat transfer occurs from these gases into the char fuel. In this way the char fuel is brought quickly up to its rapid reaction temperature, resulting in a quick startup of the cyclic char fuel reaction plant, and this is a principal beneficial object of this invention.

One particular example of a cyclic char fuel reaction plant modified in accordance with this invention and using a simplest first starting means for gas flow interconnecting is shown schematically in FIG. 1 and comprises:

1. A cyclic char fuel reaction plant comprising: a compressor means, 1, of one stage; a separate expander means, 2, of one stage whose output shaft, 3, is mechanically connected to the input shaft, 4, of the compressor, 1; two separate pressure vessel containers for containing char fuel, 5, 6 each comprising a refuel end, 7, 8, and an ash removal end, 9, 10; the container, 5, is shown connected via the changeable gas flow connection, 11, and the starting reaction chamber, 12, to the compressor delivery end outlet, 13, but during the next time period will be connected via the changeable gas flow connection, 14, to the inlet, 15, of the expander engine, 2; the container, 6, is shown connected via the changeable gas flow connection, 16, to the inlet, 15, of the expander engine, 2, but during the next time period will be connected via the changeable gas flow connection, 17, and the starting reaction chamber, 12, to the compressor delivery end outlet, 13; not shown in FIG. 1 are the means for opening and closing these changeable gas flow connections or the control means therefor.

2. The starting reaction chamber, 12, has an inlet, 18, with a fixed open gas flow connection, 19, to the delivery end outlet, 13, of the compressor, 1, and an outlet, 20, at a different place on the starting reaction chamber and connecting to the changeable gas flow connections, 11, 17;

3. The starting reaction chamber, 12, is a pressure vessel and, with the connections as shown for the first time period in FIG. 1, compressed air flows from the delivery end outlet, 13, of the compressor, 1, into the inlet, 18, of the starting reaction chamber.

4. A means for injecting liquid fuel into the starting reaction chamber, 12, is provided and comprises: a liquid fuel supply source, 21, such as a tank; a nozzle, 22, which delivers the liquid fuel as an atomized spray inside the starting reaction chamber, 12; a pump, 23, which pumps liquid fuel from the source, 21, to the nozzle, 22; a liquid fuel valve, 24, for opening or for stopping the pumping of liquid fuel to the nozzle, 22; a means for adjusting, 25, the mass flow rate of liquid fuel into the starting reaction chamber, 12, such as a pressure regulating valve on the pump discharge.

5. The ignition means comprises: an electric spark plug, 26, in the starting reaction chamber, 12; a spark generator, 27, energized from an energy source, 28, via an on-off switch, 29. This ignition means can be a continuous electric spark generator when turned on, such as are in common use on oil burners.

6. The cranking means, 30, drives the compressor, 1, when the cyclic char fuel reaction plant is to be started, and is then energized from an energy source, 31, via a means for turning the cranking means on and off, 32. Where the expander, 2, is an engine whose power output exceeds the power input to the compressor, 1, when the plant is started and running, this cranking means, 30, can be the electric generator used to absorb the excess power of the expander over the compressor during normal running, but now used as an electric motor during starting.

7. The starting means for gas flow interconnecting the starting reaction chamber inlet, 18, to the delivery end outlet, 13, of the compressor, 1, and the starting reaction chamber outlet, 20, to the char fuel containers, 5, 6, for this simplest first starting means for interconnecting shown in FIG. 1, comprises: the fixed open gas flow connection, 19, from the starting reaction chamber inlet, 18, to the compressor delivery end outlet, 13; the connections, 33, 34, from the starting reaction chamber outlet, 20, to the changeable gas flow connections, 11, 17, for the containers, 5, 6, respectively.

8. The needed on and off means for the cranking means, 30, the ignition means, 26, 27, and the liquid fuel valve, 24, are the switches, 32, 29, and the valve, 24, and these can be hand operated during starting.

A single stage compressor, 1, and a single stage expander, 2, are shown in FIG. 1 to avoid undue complexity of the drawing, but multistage compressors and multistage expanders can also be used with a number of containers, 5, 6, at least equal to the sum of the number of compressor stages plus the number of expander stages.

During starting of the modified cyclic char fuel reaction plant shown in FIG. 1 the plant operates as follows:

1. The switch, 30, is turned on thus energizing the cranking means, 30, which drives the compressor, 1. The thusly compressed air flows via the compressor delivery end outlet, 13, via the fixed open gas flow connection, 19, into the starting reaction chamber, 12, via its inlet, 18.

2. The pump, 23, is turned on and the liquid fuel valve, 24, is opened so that liquid fuel is pumped from the source, 21, to the nozzle, 22, which creates an atomized spray of liquid fuel within the starting reaction chamber, 12.

3. The switch, 29, is turned on thus energizing the spark generator, 27, which creates a spark at the spark plug, 26, which ignites the mixture of atomized fuel and air inside the starting reaction chamber, 12.

4. The burned gases thusly created in the starting reaction chamber, 12, flow via the outlet, 20, and the gas flow connection, 33, and the changeable gas flow connection, 11, into the char fuel container, 5, at its refuel end, 7, during a first time period. These hot burned gases are compressed into the pore spaces of the char fuel within the container, 5, and increase the temperature of the char fuel.

5. During the next time period the hot burned gases flow via the gas flow connection, 34, and the changeable gas flow connection, 17, into the char fuel container, 6, at its refuel end, 8, and therein increase the temperature of the char fuel similarly.

6. During this next time period the gases compressed into the container, 5, during the preceding time period flow via the changeable gas flow connection, 14, into the inlet, 15, of the expander, 2, thus reducing the pressure within the container, 5.

7. The above described flow of hot burned gases from the starting reaction chamber, 12, first into one container, 5, and then into the other container, 6, is repeated during the following time periods. In this way the temperature of the char fuel is progressively increased while the driving of the compressor, 1, is continued by the cranking means, 30.

8. After a warmup time interval of such cranking and a following heatup time interval of such cranking some of the char fuel in the containers, 5, 6, reaches its rapid reaction temperature at which point the char fuel can further heat itself by reacting with oxygen gas in adjacent compressed air. The liquid fuel valve, 24, can then be closed to stop the flow of liquid fuel into the starting reaction chamber, 12, and thereafter air will be compressed into the containers, 5, 6, to react with the hot char fuel therein. The ignition switch, 29, can also be turned off at this ending of the heatup time interval of cranking.

9. Driving of the compressor, 1, by the cranking means, 30, is continued through a startup time interval following the heatup time interval. The quantity of char fuel reaching or exceeding its rapid reaction temperature within the containers, 5, 6, increases during this startup time interval of cranking.

10. Expansion of the hot burned gases alternately from the containers, 5, 6, through the expander engine, 2, produces a work output via the shaft, 3, which assists the driving of the compressor, 1, via its input shaft, 4. As more of the char fuel within the containers, 5, 6, reaches or exceeds its rapid reaction temperature the work output of the expander engine, 2, increases. When this work output of the expander engine, 2, exceeds the work input needed to drive the compressor, 1, the cyclic char fuel reaction plant is capable of running itself and is started. The startup time interval of cranking is thus ended and the cranking means, 30, can be turned off by the switch, 32.

11. Because the hot burned gases from the starting reaction chamber are thusly compressed inside the pore spaces of the char fuel a rapid transfer of heat occurs from these burned gases into the char fuel. In this way the char fuel can be rapidly brought up to its rapid reaction temperature and a quick startup of the cyclic char fuel reaction plant is achieved, and this is a principal beneficial object of this invention.

Preferably the flow rate of starting liquid fuel into the starting reaction chamber, 12, is proportional to the flow rate of air from the compressor, 1, into the starting reaction chamber, and this proportion is preferably somewhat less than the chemically correct, or stoichiometric, proportion. In this preferred way the burned gases being compressed into the char fuel pores during starting are at a maximum temperature and starting liquid fuel is not being wasted unburned. Various sensor and control means can be used for thusly setting the ratio of mass flow rates of liquid fuel to air. One example of such a fuel to air proportion control means is shown schematically in FIG. 1 and comprises:

1. A sensor means, 35, for sensing the mass flow rate of air into the starting reaction chamber, 12. Any of the air mass flow rate sensors commercially available or known in the art can be used here.

2. A control means, 36, is responsive to the air mass flow rate sensor, 35, and operates upon the pressure regulating valve, 25, of the means for injecting liquid fuel into the starting reaction chamber, so that an essentially constant proportion is maintained between liquid fuel mass flow rate and compressed air mass flow rate into the starting reaction chamber, 12. Any of the control means known in the art can be used for this purpose.

3. The control means, 36, can be made adjustable via the adjustment, 37, so that the mass flow rate ratio of liquid fuel to air can be adjusted. The mass flow rate ratio can then be adjusted to yield maximum burned gas temperature without smoke.

Instead of directly sensing air mass flow rate into the starting reaction chamber as shown in FIG. 1, the temperature rise between air into and burned gas out of the starting reaction chamber can be sensed and act via a controller to control liquid fuel mass flow rate. Alternatively again, the temperature of the burned gases leaving the starting reaction chamber can be measured and the pressure regulating valve, 25, across the liquid fuel pump, 23, adjusted by hand to produce maximum average burned gas temperature. While mechanically simple, this hand adjustment scheme cannot compensate for air mass flow rate variations occurring during any one time period of the sub sequence of time periods between changes of connections.

An alternative means for sensing the mass flow rate of air into the starting reaction chamber can utilize sensing of pressure and rate of pressure rise which are related to air mass flow rate by the following approximate relation:

$$(MA) = (G)(USC)(P)^{\frac{1-k}{k}} \frac{(dp)}{(dt)}$$

Wherein:
MA = Air Mass Flow rate.
G = a constant.
(USC) = Volume of gas space in the starting reaction chamber and connected container.
(P) = Pressure in the container.

$\frac{(dP)}{(dt)}$ = Time rate of pressure rise in the container

Any consistent system of units can be used in the above relation.

Following the warmup time interval of cranking for starting the char fuel in the containers is at that temperature at which it can react appreciably with oxygen gas in adjacent compressed gas. In some forms of this invention the liquid fuel flow rate into the starting reaction chamber is reduced during the heatup time interval following the warmup time interval of cranking. By thusly reducing the starting liquid fuel flow rate more oxygen gas is made available to react directly with the char fuel in the containers. This reaction of char fuel with oxygen directly adds a portion of the heat of this reaction to the char fuel upon whose surface this reaction occurs. In this way the char fuel temperature is further increased up to that temperature at which it can react rapidly with oxygen gas in adjacent compressed gases. One example of a scheme for thusly reducing the proportion of liquid fuel mass flow rate to air mass flow rate into the starting reaction chamber during the heatup time interval of cranking for starting is shown schematically in FIG. 1 and comprises:

1. A temperature sensor means, 38, for sensing the char fuel temperature in each of the containers, 5, 6.

2. A control means, 39, responsive to the temperature sensor means, 38, and operative upon the means for injecting liquid fuel into the starting reaction chamber, 1, as via the control means, 36, or directly upon the pressure regulating valve, 25, so that after the char fuel reaches its appreciable reaction temperature the proportion of mass flow rate of liquid fuel to mass flow rate of air is reduced. This ends the warmup time interval of cranking for starting.

3. The control means, 39, can also operate upon the means for injecting liquid fuel into the starting reaction chamber so that after the char fuel reaches its rapid reaction temperature the flow of liquid fuel into the starting reaction chamber is stopped, as by closing the valve, 24. This ends the heatup time interval of cranking for starting.

4. The connections between the control means, 39, and the controller, 36, or the pressure regulating valve, 25, or the liquid fuel valve, 24, are not shown on FIG. 1 to avoid undue complexity of the drawing. Also not shown on FIG. 1 is a char fuel temperature sensor on the other container, 6, but this may not always be needed when the several separate containers operate essentially similarly during starting.

A temperature sensor is described above for sensing the char fuel temperature in the containers but other reaction rate sensors can alternatively be used. As the char fuel reaction rate increases the concentration of carbon monoxide in the reacted gases will increase and thus a carbon monoxide concentration sensor is another example means for sensing the char fuel reaction rate with oxygen gas. So that at least some oxygen gas will be available in the burned gases leaving the starting reaction chamber to react with the char fuel the proportion of liquid fuel mass flow rate to air mass flow rate should be set below chemically correct for this carbon monoxide concentration means for sensing char fuel reaction rate.

Different char fuels are known to react at different rates with oxygen gas and these reaction rates also differ at different operating conditions such as pressure. Hence the determination of the appreciable reaction temperature and the rapid reaction temperature of a char fuel is best done experimentally in the cyclic char fuel reaction plant. Herein and in the claims the char fuel appreciable reaction temperature is defined as that char fuel temperature at which the char fuel temperature does not decrease when the starting liquid fuel flow to the starting reaction chamber is stopped. The char fuel rapid reaction temperature is herein and in the claims defined as that char fuel temperature at which the char fuel temperature continues to increase when the starting liquid fuel flow to the starting reaction chamber is stopped.

The starting reaction chambers, 12, continue to have compressed air from the compressor, 1, flowing through even after the cyclic char fuel reaction plant is started and running itself. Thus, when each time period of the subsequence of time periods ends and a new container is connected to the compressor stage outlet for the next time period, an irreversible blowdown of the gases within the starting reaction chamber occurs since the newly connected container is at a lower pressure than prevailed in the previously connected container at the end of the preceding time period. This irreversible blowdown of gases reduces the net work output and the efficiency of the cyclic char fuel reaction plant. This is a disadvantage of the form of this invention shown in FIG. 1, and specifically of the starting means for gas flow interconnecting the compressor stage delivery end outlets and the containers to the inlets and outlets of the starting reaction chambers used in FIG. 1.

Figure 2:
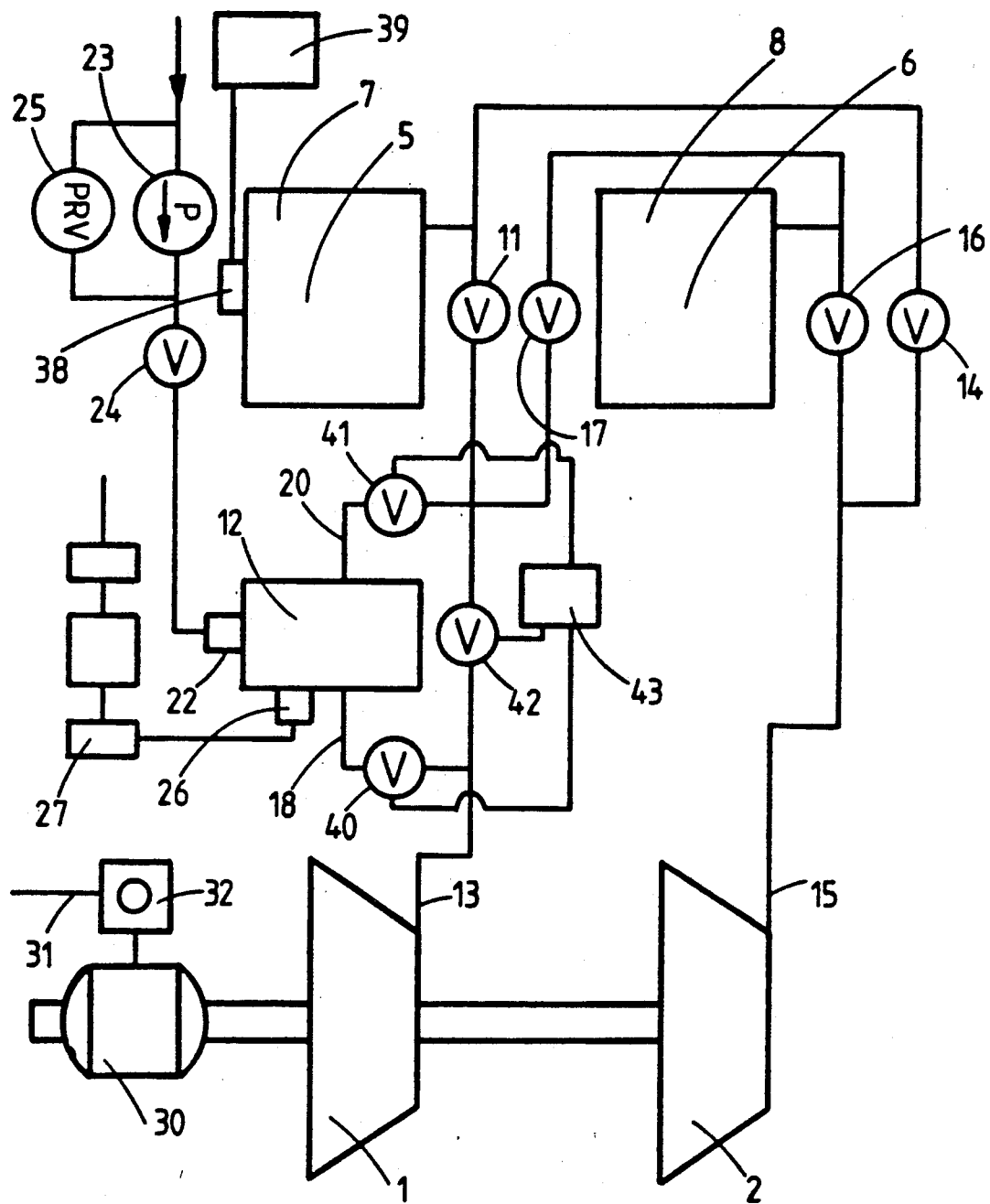

One preferred form of this invention is shown schematically in FIG. 2 wherein the starting means for gas flow interconnecting the compressor stage delivery end outlets and the containers to the inlets and outlets of the starting reaction chambers is capable of disconnecting the starting reaction chamber from the gas flow path when the heatup time interval of cranking is completed. This second form of the starting means for gas flow interconnecting comprises:

1. A first changeable gas flow connection, 40, between the compressor stage delivery end outlet, 13, and the starting reaction chamber inlet, 18.

2. A second changeable gas flow connection, 41, between the starting reaction chamber outlet, 20, and the several changeable gas flow connections, 11, 17, to each char fuel container, 5, 6, respectively.

3. A third changeable gas flow connection, 42, between the compressor stage delivery outlet, 13, and the several changeable gas flow connections, 11, 17, to each char fuel container, 5, 6, respectively.

This second form of the starting means for gas flow interconnecting can be operated as follows:

1. When the cranking means, 30, is turned on to drive the compressor, 1, for starting, the first and second changeable gas flow connections, 40, 41, respectively are opened, and the third changeable gas flow connection, 42, is closed. Compressed air then flows from the compressor, 1, into the starting reaction chamber, 12, and burned gases flow from the starting reaction chamber, 12, into the char fuel containers, 5, or 6, alternately.

2. When the heatup time interval of cranking for starting is completed, and some of the char fuel in the containers, 5, 6, has reached its rapid reaction temperature, the third changeable gas flow connection, 42, is opened and the first and second changeable gas flow connections, 40, 41, respectively are closed. Compressed air now flows directly from the compressor, 1, to the char fuel containers, 5, or 6, alternately, and the starting reaction chamber, 12, is disconnected from the containers and the compressor stages thereafter during the startup time interval of further cranking and when the cyclic char fuel reaction plant is started and running itself as is preferred.

3. The opening and closing of these changeable gas flow connections, 40, 41, 42, of this second starting means for gas flow interconnecting can be done by hand. Alternatively, and usually preferably, this opening and closing can be carried out automatically by a control means, 43, operative upon the changeable gas flow connections, 40, 41, 42, and responsive to a signal from the on and off means, 32, of the cranking means, 30, and also responsive to a signal from the char fuel temperature sensor, 38, via its control means, 39, so that these changeable gas flow connections, 40, 41, 42, are opened and closed during starting as described hereinabove.

In some forms of cyclic char fuel reaction plant each container comprises both a primary reaction chamber containing char fuel and a secondary reaction chamber free of char fuel. In the primary reaction chamber char fuel reacts with oxygen gas compressed therein to form primary reacted gas containing carbon monoxide and usually hydrogen. During expansion these primary reacted gases are burned with additional oxygen gas in the secondary reaction chamber to form secondary reacted gas comprising carbon dioxide and water. Both of these reaction chambers may be within a single pressure vessel of each container and are thus interconnected at all times. If the hot burned gases from the starting reaction chamber are compressed into these containers via the ash removal end thereof all of these gases will pass through or into the pore spaces of the char fuel and thus contribute to the rapid heating of the char fuel. This ash removal end entry of the hot burned gases is clearly preferable to their entry at the refuel end, where the secondary reaction chamber is usually located, since in this latter case those hot burned gases which go into the secondary chamber do not contact the char fuel and so do not contribute to heating up the char fuel.

Figure 3:
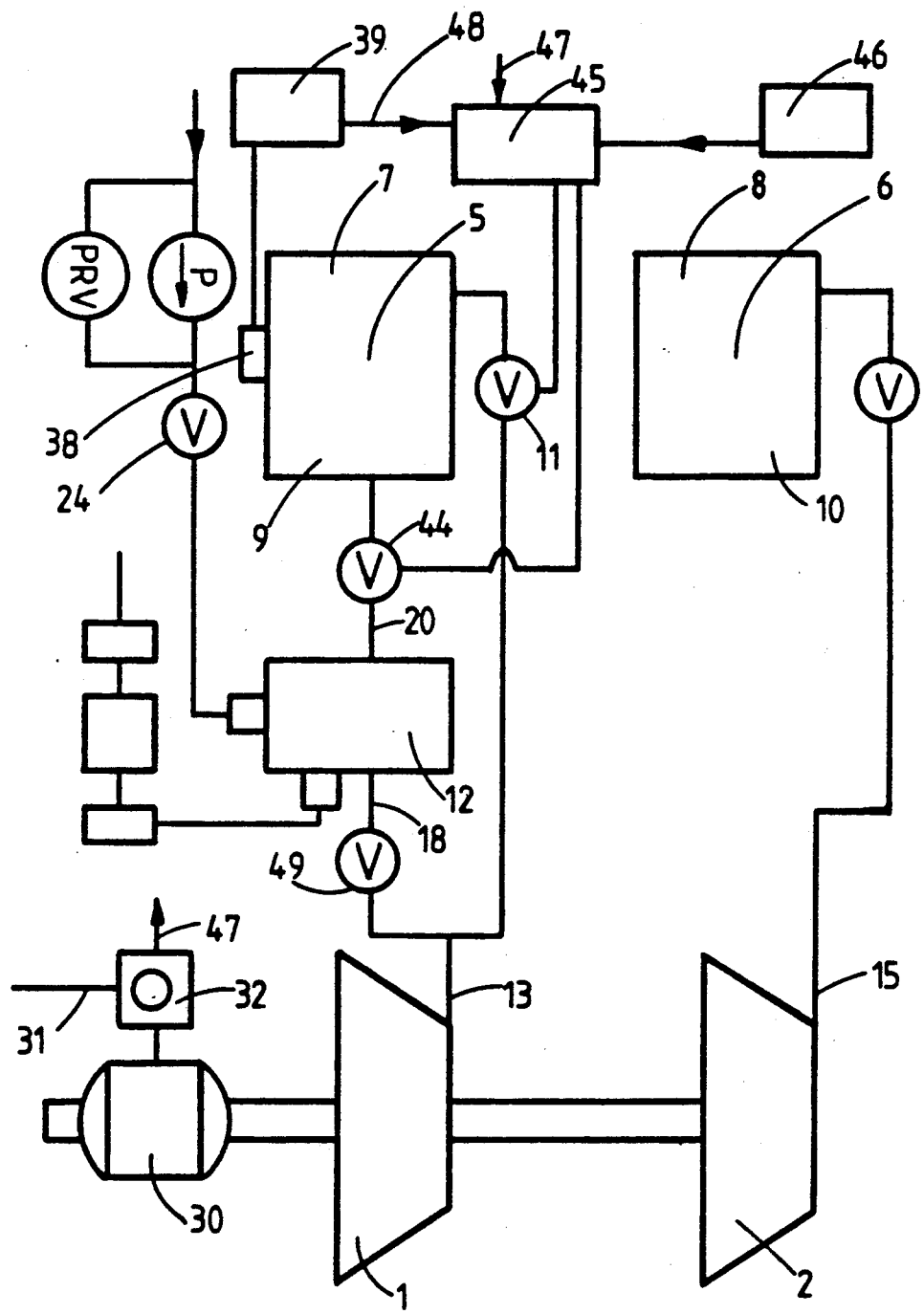

Another preferred form of this invention is shown schematically in FIG. 3 wherein the starting means for gas flow interconnecting the compressor stage delivery end outlets and the containers to the inlets and outlets of the starting reaction chambers delivers the hot burned gases from the starting reaction chamber, 12, into the ash removal ends, 9, 10, of the containers, 5, 6, respectively during the warmup and heatup time intervals of cranking for starting. This third form of the starting means for gas flow interconnecting comprises:

1. A first changeable gas flow connection, 44, from the outlet, 20, of the starting reaction chamber, 12, into the ash removal end, 9, of the container, 5.

2. A switchover means, 45, for switching the opening and closing actuation of the means for opening and closing, 46, the changeable gas flow connections, such as 11, of the cyclic char fuel reaction plant from actuation of the changeable gas flow connection, 11, to actuation of the first changeable gas flow connection, 44. When not being opened and closed by actuation of the means for opening and closing, 46, both changeable gas flow connections, 11, and 44, remain closed.

This third form of the starting means for gas flow interconnecting can be operated as follows:

1. When the cranking means, 30, is turned on to drive the compressor, 1, for starting, the switchover means, 45, is switched over so that changeable gas flow connection, 44, is opened and closed by the means for opening and closing, 46, and thus changeable gas flow connection, 11, remains closed. Hot burned gases from the starting reaction chamber, 12, thus flow into the ash removal end, 9, of the container, 5, during those time periods when container, 5, is connected to delivery end outlet, 13, as is preferred for some cyclic char fuel reaction plants.

2. When the char fuel in the containers reaches its rapid reaction temperature at the end of the heatup time interval of cranking the switchover means, 45, is switched back so that changeable gas flow connection, 11, is opened and closed by the means for opening and closing, 46, and thus changeable gas flow connection, 44, remains closed following the heatup time interval when liquid fuel flow to the starting reaction chamber can also be stopped. Compressed air from the delivery end outlet, 13, of the compressor, 1, is then delivered directly into the container, 5, via the changeable gas flow connection, 11, after the heatup time interval of cranking and when the plant is started and running itself.

3. This third form of the starting means for gas flow interconnecting is shown in FIG. 3 only for the containers, 5, but similar changeable gas flow connections and switchover means are also used on the other containers.

4. The changing over of the switchover means, 45, as described above can be done by hand or automatically. For automatic changing the switchover means, 45, is made responsive to a signal, 47, from the on and off means, 32, of the cranking means, 30, and a signal, 48, from the control means, 39, of the char fuel temperature sensor, 38, so that operation as described above in items 1 and 2 is achieved.

This third form of the starting means for gas flow interconnecting can be further improved by adding a second changeable gas flow connection, 49, between the delivery end outlet, 13, of the compressor, 1, and the inlet, 18, of the starting reaction chamber, 12. This second changeable gas flow connection, 49, is opened when cranking commences for starting and is closed following the heatup time interval of cranking. In this way, the starting reaction chamber can be disconnected from the containers and the compressor stages after starting.

Admission of hot burned gases into the ash removal end of the containers during starting can also be achieved by modifying the forms of the starting means for gas flow interconnecting shown in FIG. 1 and FIG. 2 by interposing a diverter valve between the changeable gas flow connection, 11, and the container, 5. During the warmup time interval and heatup time interval of cranking for starting this diverter valve is turned to direct hot burned gases from the changeable gas flow connection, 11, into the ash removal end, 9, of the container, 5. Following the heatup time interval of cranking and when the plant is capable of running itself this diverter valve is turned to direct compressed air from the changeable gas flow connection, 11 into the normal running air entry location of the container, 5.

The foregoing descriptions of several different starting means for gas flow interconnecting the starting reaction chambers to the compressor stage delivery end outlets and the containers are only examples and it is not intended thereby to limit this element only to these described examples. Whatever starting means for gas flow interconnecting is used it is to function so that during cranking for starting:

1. Each starting reaction chamber inlet is open gas flow connected to the delivery end outlet of but one stage of the compressor, and each delivery end outlet of each stage of the compressor is open gas flow connected to but one starting reaction chamber inlet;

2. Each container is open gas flow connected in turn for a time period to each starting reaction chamber outlet in a sub sequence of time periods of open gas flow connections to starting reaction chambers, proceeding in time order of increasing delivery pressure of the compressor stages connected to the starting reaction chamber inlets;

3. Each starting reaction chamber outlet is open gas flow connected to but one container during any one time period of the sub sequence of time periods of open gas flow connections, and each container is only open gas flow connected to but one starting reaction chamber outlet during any one time period of the sub sequence of time periods.

It is not necessary that liquid fuel flow into the starting reaction chambers be stopped when only a small portion of the char fuel in the containers has reached the rapid reaction temperature. In effect the heatup time interval can be prolonged as desired up to the point where the cyclic char fuel reaction plant is capable of running itself, in which case the startup time interval of cranking becomes very short or of zero length.

When the cyclic char fuel reaction plant is started and capable of running itself the cranking means for driving the compressor during starting is either turned off, as for example if the expander is an engine, or is turned over to its normal function during normal plant running as for example becoming an electric generator. This turning off or turning over of the cranking means can be done most simply by hand. Where the expander is an engine and is mechanically coupled to drive the compressor the rotational speed of the expander and compressor will increase as the plant becomes capable of running itself. This increase of speed can act via a speed sensor means and a control means responsive thereto to operate on the on-and off means for the cranking means to automatically turn off the cranking means. Other sensor means for sensing when the cyclic char fuel reaction plant is capable of running itself can alternatively be used for this automatic scheme for turning off the cranking means.

The starting apparatus of this invention for cyclic char fuel reaction plants differ from and are an improvement over the starting means described in the prior art in various ways as, for example, the following:

1. The starting means of this invention burns a liquid fuel with the compressed air about to be compressed into the pore spaces of the char fuel. In this way maximum gas temperature can be achieved and these hot gases are brought into direct contact with the char fuel to be heated. In U.S. Pat. No. 4,509,957 column 7 lines 36 through 63, starting means are described including a combustion fired heat exchanger for heating up the compressed air to be compressed into the char fuel pores. But with this heat exchanger the air temperature going into the char fuel pores is necessarily less than the burned gas temperature of combustion gases on the other side of the heat exchanger and a slower heating of the char fuel and a slower start result than is obtained with the starting means of this invention.

2. In U.S. Pat. No. 4,509,957, column 18 lines 3 through 29 and FIG. 6, a gas fuel is burned directly with the compressed air about to be compressed into the pores of char fuel located in an underground coal seam container. But the mixture ratio of gas fuel to air must be kept within a narrow range of values, close to the chemically correct ratio, if ignitability and burnability are to be retained. The starting means described herein use a liquid fuel burned as an atomized spray with the compressed air and a very wide range of mixture ratios of liquid fuel to air are ignitable and burnable both much leaner and much richer than chemically correct. It is because a wide range of local fuel to air ratios are created by evaporation from each liquid fuel droplet of the atomized spray that almost all overall mixture ratios are burnable, an ignitable fuel vapor to air ratio always existing somewhere around each liquid fuel droplet. Thus fuel deficient mixture ratios can be used with the invention described herein during the heatup time interval of cranking and the extra oxygen thus made available can react with the char fuel to assist in the heating up of the char fuel for starting.

3. The starting means of this invention burns the liquid fuel with the compressed air inside a separate pressure vessel, the starting reaction chamber. In the preferred forms of this invention this starting reaction chamber is disconnected from the compressor stage delivery end outlets and the containers after the heatup time interval of cranking and after the cyclic char fuel reaction plant is started and running. The prior art starting means did not use a separate starting reaction chamber.

4. In some forms of the starting means of this invention the hot burned gases from the starting reaction chamber enter the ash removal end of the char fuel container. In consequence all of the hot burned gases pass through or into the pore spaces of the char fuel and a maximum possible transfer of heat occurs from the hot gases to the char fuel. The prior art starting means did not direct heated gases into the ash removal end of the containers during starting.

Having thus described my invention what I claim is:

1. A cyclic char fuel reaction plant comprising: compressor means comprising a number of stages and each stage comprising a delivery end outlet at its high pressure end, said number of compressor stages being at least one, means for driving said compressor via an input shaft; expander means separate from said compressor and comprising a number of stages at least equal to one; a number of separate containers for containing char fuel, said number of separate containers being at least equal to the number of said compressor stages plus the number of said expander stages, each said separate container comprising a refuel end through which char fuel is refueled into said container and an ash removal end from which ashes are removed from said container; separate changeable gas flow connections, which are openable and closeable, from each of said containers to each delivery end outlet of each said stage of said compressor means; means for opening and closing said several separate changeable gas flow connections between said containers and said delivery end outlets of said compressor stages, so that each container is opened for a time period to each delivery end of each stage of said compressor means, in a sub sequence of time periods of open gas flow connections to compressor stages proceeding in time order of increasing compressor stage delivery pressure, said sub sequence of time periods of open gas flow connections to said compressor stages is repeated for each of said containers by said means for opening and closing; means for controlling said means for opening and closing so that the delivery end outlet of each stage of said compressor means has an open gas flow connection to one container at all times when said char fuel reaction plant is operating;

wherein the improvement comprises adding thereto:
a number of separate starting reaction chambers each comprising an inlet and a separate outlet said inlet and outlet being at separate places on each said starting reaction chamber, said number of separate starting reaction chambers being equal to the number of stages of said compressor means;

each said starting reaction chamber further comprising means for injecting liquid fuel into said starting reaction chamber said injection means comprising:
a liquid fuel supply source;
nozzle means for creating an atomized liquid fuel spray inside said starting reaction chamber;
pumping means for pumping liquid fuel from said liquid fuel supply source to said nozzle means;
liquid fuel valve means for opening and for stopping said pumping of liquid fuel from said supply source to said nozzle means;
adjustment means for adjusting the mass flow rate of liquid fuel into said starting reaction chamber;
ignition means for igniting said atomized liquid fuel spray within each said starting reaction chamber and comprising means for turning said ignition means on and off, said ignition means comprising an energy source;
cranking means for driving said compressor means when said char fuel reaction plant is to be started so that: said driving can be continued through a warmup time interval for heating said char fuel to that temperature at which some of it reacts appreciably with oxygen gas in adjacent compressed gas; said driving can be continued through a warmup time interval for heating said char fuel to that temperature at which some it it reacts appreciably with oxygen gas in adjacent compressed gas; and said driving can be continued thereafter through a startup time interval for heating a sufficient portion of said char fuel to said rapid reaction temperature so that said char fuel reaction plant is capable of driving itself; and said cranking means for driving can be turned off when said char fuel reaction plant is capable of driving itself; said cranking means for driving comprising an energy source and a means for turning said driving means on and off;
on and off means for turning on said cranking means for driving, said ignition means, and for opening said liquid fuel valve means when said char fuel reaction plant is to be started; and for turning off said ignition means, and for closing said liquid fuel valve means after said heatup time interval of cranking, and for turning off said cranking means for driving when said char fuel reaction plant is capable of driving itself;
starting means for gas flow interconnecting said starting reaction chambers to said delivery end outlets of said stages of said compressor means and to said containers so that during said warmup and heatup time intervals of cranking for starting:
each starting reaction chamber inlet is open gas flow connected to the delivery end outlet of but one stage of said compressor means, and each delivery end outlet of each stage of said compressor means is open gas flow connected to but one starting reaction chamber inlet;
each said container is open gas flow connected in turn for a time period to each said starting reaction chamber outlet in a subsequence of time periods of open gas flow connections to starting reaction chambers, proceeding in time order of increasing delivery pressure of the compressor stages connecting to said starting reaction chamber inlets;
each starting reaction chamber outlet is open gas flow connected to but one container during any one time period of said sub sequence of time periods of open gas flow connections, and each container is only open gas flow connected to but one starting reaction chamber outlet during any one time period of said sub sequence of time periods.

2. A cyclic char fuel reaction plant as described in claim 1 and further comprising:
sensor means for sensing the mass flow rate of air from each said compressor stage into each said connected starting reaction chamber;
control means, responsive to said means for sensing the mass flow rate of air and operative upon said means for injecting liquid fuel into said starting reaction chamber, so that the mass flow rate of liquid fuel into each said starting reaction chamber is proportional to the mass flow rate of air into that same starting reaction chamber and so that said mass flow rate proportion of fuel to air is approximately constant.

3. A cyclic char fuel reaction plant as described in claim 2, wherein said starting means for gas flow interconnecting said starting reaction chambers to said containers and to said delivery end outlets of said compressor stages connects into the ash removal ends of said containers and only during said warmup and heatup time intervals of cranking for starting.

4. A cyclic char fuel reaction plant as described in claim 2 wherein said starting means for gas flow interconnecting said starting reaction chambers to said containers and to said delivery end outlets of said compressor stages gas flow disconnects said starting reaction chambers from said containers and from said delivery end outlets of said compressor stages after said heatup time interval of cranking for starting.

5. A cyclic char fuel reaction plant as described in claim 4 wherein said starting means for gas flow interconnecting said starting reaction chambers to said containers and to said delivery end outlets of said compressor stages connects into the ash removal ends of said containers and only during said warmup and heatup time intervals of cranking for starting.

6. A cyclic char fuel reaction plant as described in claim 2 wherein said separate expander means is an engine comprising an output shaft which is driveably connected to said input shaft of said compressor means; and further comprising:
sensor means for sensing when said char fuel reaction plant is capable of running itself;
control means, responsive to said sensor means for sensing when said plant is capable of running itself, and operative upon said means for turning said cranking means for driving on and off, so that said cranking means for driving is turned off when said char fuel reaction plant is capable of running itself.

7. A cyclic char fuel reaction plant as described in claim 1 and further comprising:
sensor means for sensing the mass flow rate of air from each said compressor stage into each said connected starting reaction chamber;
control means responsive to said means for sensing the mass flow rate of air and operative upon said means for injecting liquid fuel into said starting reaction chamber, so that the mass flow rate of liquid fuel into each said starting reaction chamber is proportional to the mass flow rate of air into that same starting reaction chamber;

sensor means for sensing when char fuel within said containers is sufficiently hot to react appreciably with oxygen gas in adjacent compressed gas and also when char fuel therein is sufficiently hot to react rapidly with oxygen gas in adjacent compressed gas;

control means, responsive to said sensor means for sensing char fuel temperature, and operative upon said adjustment means for adjusting the mass flow rate of liquid fuel into said starting reaction chambers and also upon said liquid fuel valve means, so that: during said heatup time interval of driving by said cranking means the mass flow rate proportion of fuel to air is less than during said warmup time interval of driving by said cranking means; and so that said liquid fuel valve means are closed to stop flow of liquid fuel into said starting reaction chambers after said heatup time interval of driving.

8. A cyclic char fuel reaction plant as described in claim 7 wherein said starting means for gas flow interconnecting said starting reaction chambers to said containers and to said delivery end outlets of said compressor stages connects into the ash removal ends of said containers and only during said warmup and heatup time intervals of cranking for starting.

9. A cyclic char fuel reaction plant as described in claim 7 wherein said starting means for gas flow interconnecting said starting reaction chambers to said containers and to said delivery end outlets of said compressor stages gas flow disconnects said starting reaction chambers from said containers and from said delivery end outlets of said compressor stages after said heatup time interval of cranking for starting.

10. A cyclic char fuel reaction plant as described in claim 9 wherein said starting means for gas flow interconnecting said starting reaction chambers to said containers and to said delivery end outlets of said compressor stages connects into the ash removal ends of said containers and only during said warmup and heatup time intervals of cranking for starting.

11. A cyclic char fuel reaction plant as described in claim 7 wherein said control means, responsive to said char fuel temperature sensor means, is additionally operative upon said means for turning said ignition means on and off, so that said ignition means is turned off when said liquid fuel valve means are closed.

12. A cyclic char fuel reaction plant as described in claim 7 wherein said separate expander means is an engine comprising an output shaft which is driveably connected to said input shaft of said compressor means; and further comprising:

sensor means for sensing when said char fuel reaction plant is capable of running itself;

control means, responsive to said sensor means for sensing when said plant is capable of running itself, and operative upon said means for turning said cranking means for driving on and off, so that said cranking means for driving is turned off when said char fuel reaction plant is capable of running itself.

* * * * *

UNITED STATES PATENT AND TRADEMARK OFFICE
CERTIFICATE OF CORRECTION

PATENT NO. : 5,031,397
DATED : July 16, 1991
INVENTOR(S) : Joseph C. Firey

It is certified that error appears in the above-identified patent and that said Letters Patent is hereby corrected as shown below:

Column 17, line 27: change, "warmup," to -- heatup --.

Column 17, line 29: change, "appreciably," to, -- rapidly --.

Signed and Sealed this

Fifth Day of January, 1993

Attest:

DOUGLAS B. COMER

*Attesting Officer*      *Acting Commissioner of Patents and Trademarks*